May 12, 1953  J. W. KING ET AL  2,638,005
DRIVING MECHANISM
Filed Oct. 1, 1949  3 Sheets-Sheet 1
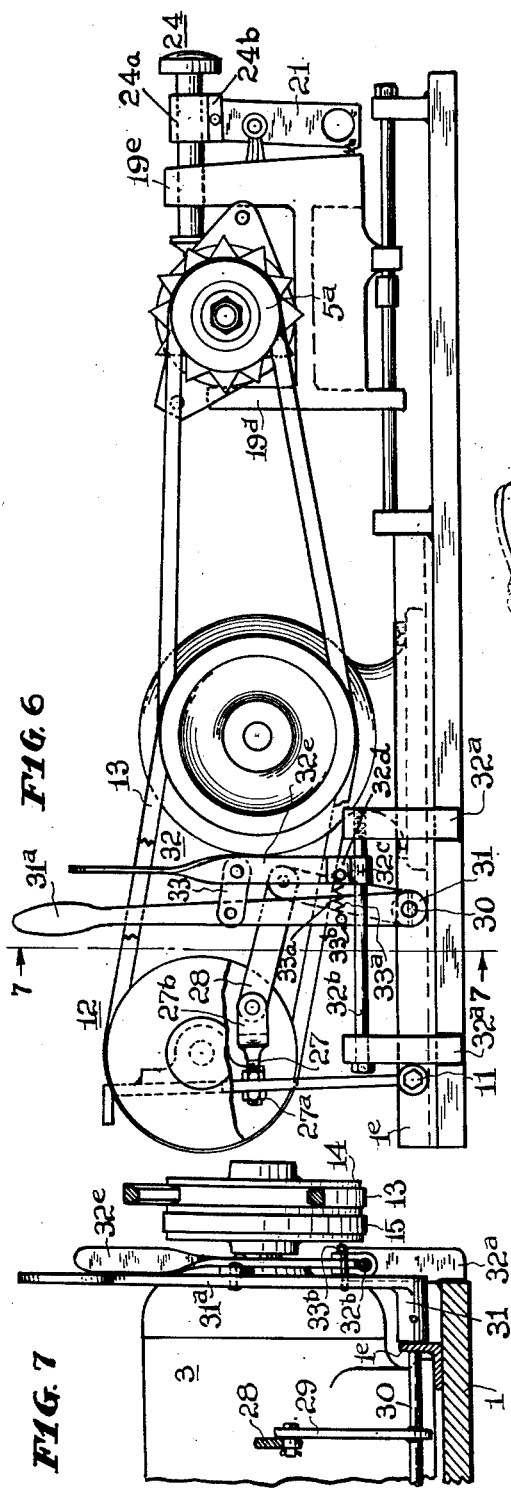
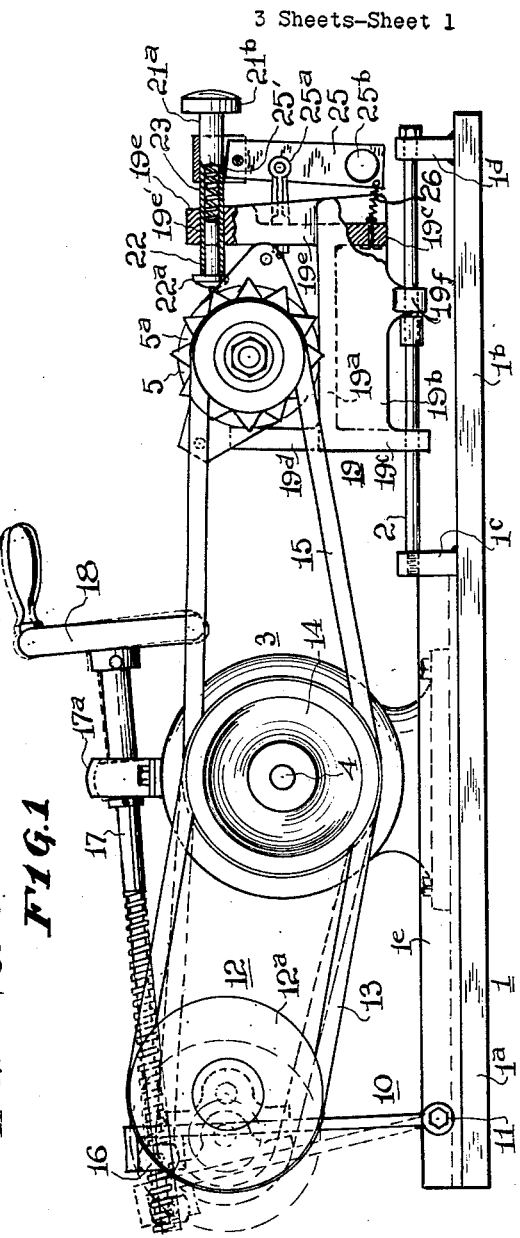
INVENTORS
JOHN W. KING
JAMES J. McNAMEE
BY Geo. B. Pitts
ATTORNEY May 12, 1953  J. W. KING ET AL  2,638,005
DRIVING MECHANISM
Filed Oct. 1, 1949                    3 Sheets-Sheet 2
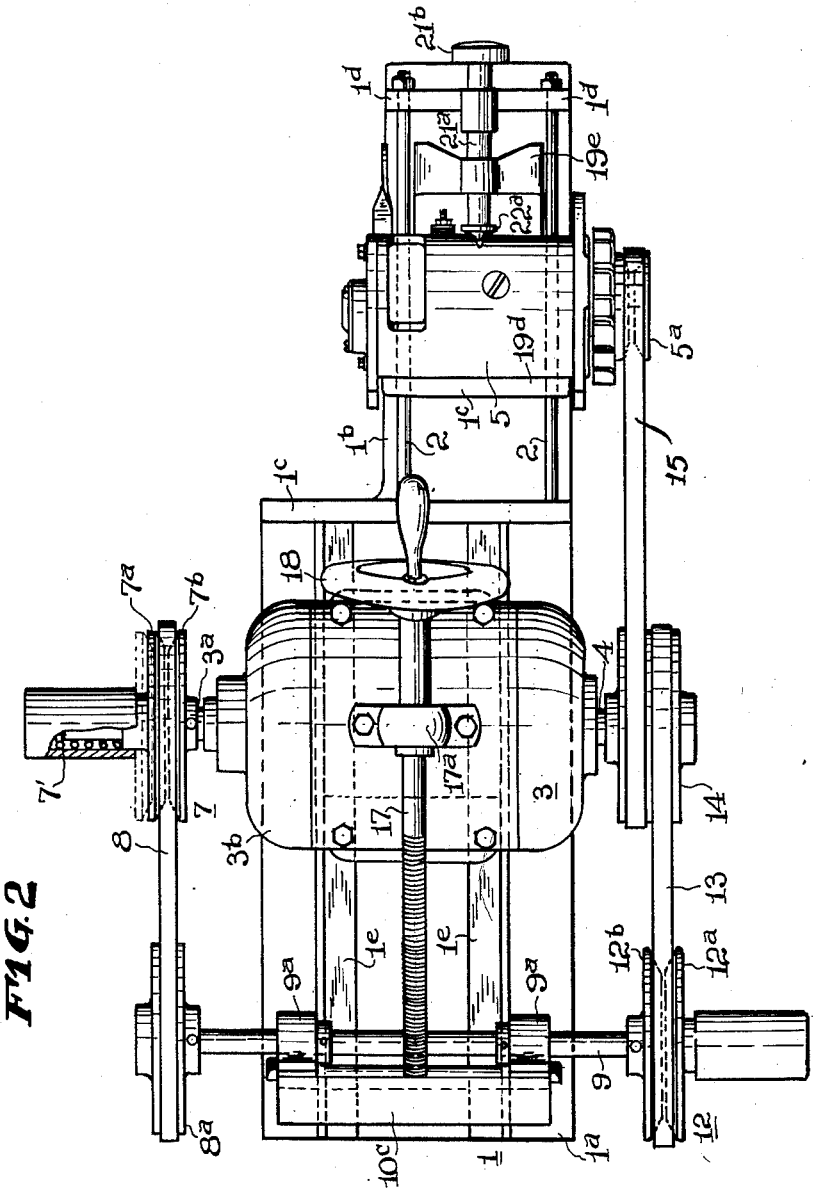
INVENTORS,
JOHN W. KING
JAMES J. McNAMEE
BY Geo. B. Pitts
ATTORNEY May 12, 1953    J. W. KING ET AL    2,638,005
DRIVING MECHANISM Filed Oct. 1, 1949    3 Sheets-Sheet 3

INVENTORS.
JOHN W. KING
JAMES J. McNAMEE

BY Geo. B. Titti
ATTORNEY

Patented May 12, 1953

2,638,005

UNITED STATES PATENT OFFICE 2,638,005

DRIVING MECHANISM

John W. King, Warrensville Heights, and James J. McNamee, Garfield Heights, Ohio, assignors to Miles Park Machine & Tool, Inc., Cleveland, Ohio, a corporation of Ohio Application October 1, 1949, Serial No. 119,162

4 Claims. (Cl. 74—230.17)

This invention relates to a driving mechanism of the type employing V-pulleys, whereby various speeds may be obtained in a rapid and simple manner.

In mechanisms of this type, of which we have knowledge, the range of speed transmitted to the shaft of the member to be driven has been limited, so that such mechanisms have been found to be unadapted for use where a wide range of speed is required and at the same time avoid employing a large number of power transmitting elements.

The invention has been applied to the testing of generators employed on self-driven vehicles and in such application the speeds of the generators while being tested must be consistent with and equal to that at which the vehicles are normally driven, as well as at higher or excessive speeds.

One object of the invention is to provide an improved driving mechanism consisting of few parts in compact relation and at the same time provide for a wide range of speed for the member which is to be tested.

Another object of the invention is to provide an improved mechanism of this type having improved devices for adjusting or varying the driving ratio of the driving elements and locking the apparatus to be tested, in position and releasing it, whereby both time and labor are economized.

Other objects of the invention will be apparent to those skilled in the art to which our invention relates from the following description taken in connection with the accompanying drawings, wherein Fig. 1 is a side elevation of a mechanism embodying our invention;

Fig. 2 is a plan view;

Fig. 6 is a side elevation, similar to Fig. 1, but showing a modified form of construction; and Fig. 7 is a section on the line 7—7 of Fig. 6.

Figure 3:
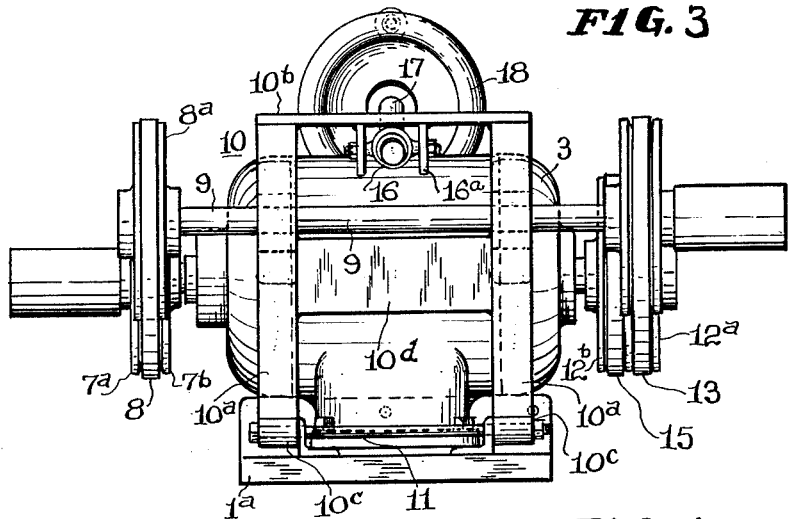
Fig. 3 is an end elevation looking toward the right of Figs. 1 and 2.
Figure 4:
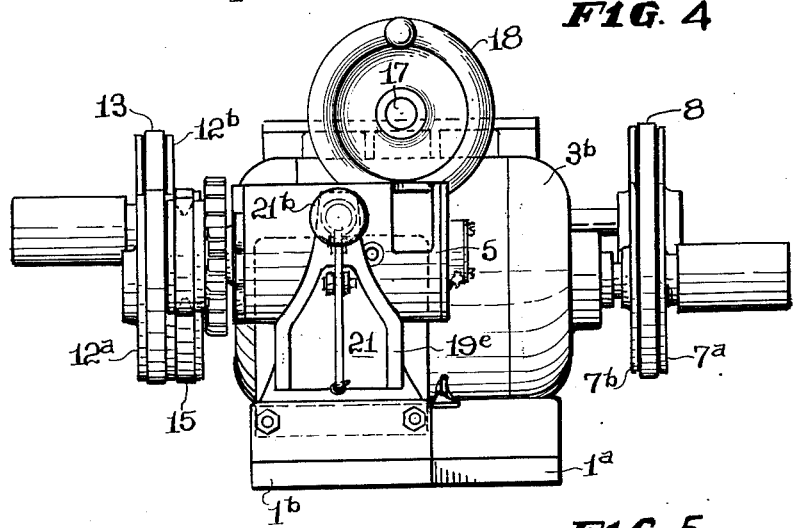
Fig. 4 is an end elevation looking toward the left of Figs. 1 and 2.

In the drawings, 1 indicates a base adapted to be mounted on a work table or other suitable support.

The base 1 consists of a main section 1a and an extended section 1b, preferably integrally connected to the main section. The inner end of the main section 1a and outer end of the section 1b are provided with transverse, vertically disposed bars 1c, 1d, respectively, in which the opposite ends of a pair of parallelly related guides 2 are supported in a plane above and in spaced relation to the base section 1b. The purpose of the guides 2 is later referred to. The guides are preferably round in cross section and may consist of suitable cap screws, the inner end portion of each screw being mounted in and extending through an opening formed in the bar 1d and its outer end being threaded into an alined opening formed in the bar 1c. 1e indicates a pair of angles suitably fixed to the base section 1a and preferably extending from end to end thereof. 3 indicates an electric motor suitably fixed to the base section 1a intermediate the ends thereof and between the angles 1e, the shaft 3a of the motor being disposed transversely of the base section. The motor shaft 3a is mounted in suitable bearings supported in the motor housing 3b and extends outwardly from one end thereof. The opposite end of the housing 3b fixedly supports a stud shaft 4 disposed axially of the motor shaft 3a. The purpose of the shaft 4 will later be set forth.

5 indicates a generator removably mounted on the base section 1b as later set forth.

6 indicates as an entirety a driving mechanism for transmitting power from the motor shaft 3a to the belt pulley 5a on the shaft of the generator 5. The driving mechanism 6 comprises the following: 7 indicates a pulley consisting of two disks 7a, 7b, suitably keyed to the motor shaft 3a to be driven thereby. The opposed faces of the disks are inclined downwardly and inwardly to adapt the disks to an endless V-belt 8 an transmit power through the latter to drive a pulley 8a, the latter having a V-groove to accommodate the belt 8. One of the disks (preferably the outer disk 7a) is slidable endwise of the shaft 3a away from and toward the disk 7b, whereby the relationship of the belt 8 to the axis of the disks may be varied. The hub of the disk 7a is yieldingly held against the hub of the disk 7b by suitable spring operated devices on and surrounding the motor shaft 3a outwardly of the pulley disk 7a, the spring for biasing said device being shown at 7'. Any suitable construction of spring operated devices for the pulley disks 7a may be employed; as the construction of these devices form no part of the present invention, it is not shown in detail. The pulley 8a is suitably fixed to one end portion of a countershaft 9 which is mounted intermediate its ends in spaced bearings 9a, 9a. The bearings 9a, 9a, are mounted on the upper end portion of a transversely disposed frame 10, preferably consisting of spaced side bars 10a connected together at their upper ends by a plate 10b disposed at right angles to the bars 10a. The lower ends of the bars 10a terminate in knuckles 10c which rotatably engage the opposite end portions of a shaft 11. The shaft 11 is supported in and extends through alined openings formed in the upstanding webs of the angles 1e. The side bars 10a are shown connected together intermediate their ends by a cross member 10d to insure a rigid relationship between the bars 10a.

12 indicates a pulley mounted on the opposite end portion of the shaft 9. The pulley 12 consists of two disks 12a, 12b, suitably keyed to the shaft 9 to be driven thereby. The opposed faces of the disks are inclined downwardly and inwardly to adapt the disks to an endless V-belt 13. The outer disk 12a is slidable endwise of the shaft 9, away from and toward the disk 12b whereby the relationship of the belt 13 to the axis of the disks may be varied. 14 indicates a dual-grooved pulley rotatably mounted on the shaft 4, one of the grooves of the pulley being in alinement with the pulley 12 and of V-shape in cross section to accommodate the belt 13. The other groove of the pulley 14 is alined with the pulley 5a, for engagement by an endless belt 15 to provide a driving connection from the pulley 14 to the pulley 5a on the shaft of the generator 5. As will be understood from the foregoing description, operation of the motor 3 rotates pulley 7, which through the belt 8 and pulley 8a, drives the shaft 9 and that shaft 9, through pulley 12, belt 13, pulley 14 and belt 15, the pulley 5a is driven, the speed of the pulley 5a being dependent on the ratio of each pulley relative to the adjacent pulley. In the form of construction disclosed, we provide (a) one pair of pulleys 7 and 14, in axial relation, pulley 7 being fixed to motor shaft 3a and pulley 14 being rotatable on shaft 4, as already set forth, and a seperate pair of pulleys 8a, 12, fixed to shaft 9 in parallel relation to the axis about which pulleys 7 and 14 rotate, one pulley of each pair being of the relatively movable disk type, each thereof being related to a pulley of standard type. In this arrangement, in employing a pulley of the relatively movable disk type in each pair and a V-belt of a predetermined size for driving connection between the disk type of pulley and the adjacent standard type of pulley, bodily movement of one pulley toward or from the other pulley in co-operation with the spring controlled pulley disk, will effect a variation in the speed ratio between the pulleys. That is, pulley 8a has a fixed radius, whereas disks 7a, 7b, are relatively moveable to effect engagement of the belt 8 therewith at different radii of its axis; consequently, when the pulley 8a is moved away from the pulley 7, the pull on the belt will move the disk 7a outwardly against the tension of the adjacent spring, so that the belt will engage the disks on annuli on a shorter radius remote from their peripheries, whereas if the pulley 8a is moved toward pulley 7 the tension of the spring 7' will move the disk 7a toward the disk and the belt 8 will engage the disks on annuli of longer radius. As will be understood, the adjustment of the pulley 8a toward or from the pulley 7 is always made while they are being driven, so that when the pulley 8a is moved away from the pulley 7, the endwise pull on the belt runs will force the disk 7a outwardly and simultaneously the belt will, during reeving thereof on the disks 7a, 7b, gradually ride inwardly on the latter a distance proportionately to the movement or adjustment of the pulley 8a away from the pulley 7. Adjustment of the pulley in the opposite direction will permit the belt to move outwardly and the disk 7a to move inwardly under influence of the adjacent spring toward the disk 7b. It will be understood that when the pulley 12 is moved toward or from the pulley 14, the disks 12a, 12b, and belt 13 operate similarly to the disks 7a, 7b, and belt 8, it being apparent that it is immaterial as to whether one or the other of two related pulleys is moved. In the form of construction shown, the shaft 9 carries at one end a standard type of pulley and a disk type of pulley at its opposite end and as the frame 10 is swingable on the shaft 11, both pulleys 8a and 12 are adjustable as a unit toward and from the pulleys 7 and 14, respectively, which enables the driving ratio between pulleys 7 and 8a and between pulleys 12 and 14, respectively, to be simultaneously increased or decreased. As the disk type pulley 7 is mounted on the motor shaft 3a and drives pulley 8 on the shaft 9 and the disk pulley 12 is on shaft 9 and drives pulley 14, the outward adjustment of the frame 10 will simultaneously effect an increase in speed of the pulley 8a, shaft 9 and pulley 12 relative to motor shaft 3a and an increase in speed of pulley 14 relative to the pulley 12 to drive the generator shaft from pulley 14 at speeds required for testing the generator. This arrangement is advantageous since the driving of the pulley 5a may be changed from one speed to a higher or lower speed by a relatively slight adjustment of the frame 10.

In the present disclosure, the pulleys 8a and 14 have substantially the same pitch diameters and when the hubs of the disks 7a and 12a are in engagement with the hubs of the disks 7b and 12b, respectively (under influence of the springs 7'), the pitch diameters of the pulleys 7 and 12 are substantially the same as that of the pulleys 8a and 14. In this arrangement, adjustment of the frame outwardly increases the speed of the shaft 9 relative to motor shaft 3a and increases the speed of the pulley 14 relatively to the increased speed of the shaft 9.

The mechanism for adjusting the frame 10 about the shaft 11 consists of a nut 16 and a screw 17 engaged therewith. The nut 16 is preferably trunnioned on and between a pair of lugs 16a provided on the plate 10b (see Fig. 3), whereas the screw 17 is mounted in a suitable bearing preferably swivel-supported in a member 17a on the housing of the motor 3, the bearing serving to prevent endwise movement of the screw 17 when it is rotated to adjust the frame 10 in either direction (see dotted lines in Fig. 1). 18 indicates a crank on the outer end of the screw 17 for turning the latter.

The generator 5 is removably fixed to a cradle, indicated as an entirety at 19, and the latter is mounted on and adjustable along the guides 2, whereby the generator 5 may be initially moved toward the motor 3 to permit the belt 15 to be looped on and around the pulley 5a and thereafter the cradle 19 is moved in the opposite direction and secured to the guides 2 by a lock-and-release mechanism indicated as an entirety at 20 to impart sufficient tautness in the belt 15 to drive the pulley 5a.

The cradle 19 is shaped to provide a bottom wall 19a, depending side and end walls 19b, 19c, respectively, and spaced front and rear transverse uprights 19d, 19e. The front depending end wall 19c and a transverse bar 19f, which is connected to the side walls 19b, are formed with openings through which the guides 2 extend to slidably support the cradle 19 on the guides and the lock-and-release mechanism 20 for the cradle is interposed between bar 19f and the guides, as later set forth. As shown in Fig. 1, the generator 5 is seated on the bottom wall 19a and against the wall 19d and removably engaged by a clamping mechanism indicated as an entirety at 21. The clamping mechanism 21 comprises the following: 21a indicates a hollow thrust member slidably mounted in an opening 19e' formed in the upper portion of the upright 19e, in a plane above the axis of the generator 5 when the latter is seated in the cradle 19. The thrust member 21a is closed at its outer end and provided with a head 21b. 22 indicates a plunger extending into the outer end of thrust member and slidably fitting the inner walls thereof. The outer end of the plunger 22 is provided with an enlargement 22a arranged to engage the generator 5 and clamp it to the bottom 19a and upright 19d. 23 indicates a coiled spring mounted in the thrust member 21a between its closed end and the plunger 22 and arranged to support the outer end of the plunger 22 in extended relation to the thrust member 21a but to be put under compression when the latter is thrust inwardly. In this operation of the thrust member 21a, it operates first through the spring 23 to effect engagement of the plunger 22 with the generator and in the further movement of the thrust member it telescopes on the plunger to engage the plunger enlargement 22a under pressure and effect a force thereon equal to that imparted to the thrust member, the latter being automatically locked in its operated position against outward movement by a locking mechanism indicated as an entirety at 24. The locking mechanism 24 consists of a loop 24a somewhat larger than the thrust member 21a and extending therearound and terminating in downwardly extending side-by-side extensions 24b pivotally conected to the upper end portion of a rocker 25 fulcrumed intermediate its ends on a bracket 25a, which is mounted on the upright 19e. The upper end of the rocker 25 terminates in a cam 25' in engagement with the thrust member 21a. The lower end of the rocker is conected to a spring 26, suitably anchored on the rear end wall 19c of the cradle 19 and operates to bias the upper end of the rocker outwardly to maintain the cam 25' in engagement with the thrust member 21a and rock the loop 24a counterclockwise (as viewed in Fig. 1) on the walls of the thrust member 21a, whereby the loop and cam engage the thrust member 21a under pressure and prevent endwise movement thereof outwardly. Accordingly it will be observed that when the thrust member 21a is moved inwardly to clamp the generator 5 to the wall of the cradle 19, the cam 25' and loop 24a ride on the thrust member and at the limit of inward movement of the latter they automatically lock it against outward movement. This arrangement permits the worker to simply apply a quick heavy blow on the head of the thrust member the effect of which is to securely clamp the generator 5 in position. To release the generator 5 for removal, the lower end of the rocker 25 is formed with a finger-opening 25b, whereby the rocker may be rocked in opposition to the spring 26 and effect disengagement of the cam 25' and loop 24a from the thrust member 21a, which will then move outwardly under the influence of the spring 23 and release the plunger 22 from the generator.

Figure 5:
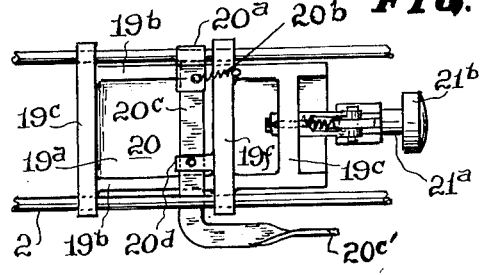
Fig. 5 is a fragmentary bottom plan view of parts shown in Figs. 1 and 2 (the generator and belt being omitted)

The lock-and-release mechanism 20 operates in a manner similar to the locking mechanism 24 and consists of a loop 20a surrounding one of the guides 2. The extensions of the loop 20a are pivoted to the inner end of a rocker 20c, which is pivoted intermediate its ends on a lug 20d, provided on the bar 19f. The inner end of the rocker 20c terminates in a cam (which is similar to cam 25' on the rocker 25) which co-operates with the loop 20a to engage the guide under the influence of a spring 20b. One end of the spring 20b is preferably connected to the pivot between the loop and rocker, its other end being anchored on the bar 19f. The outer end of the rocker 20c is extended to form a handle 20c', whereby it may be operated to release the cam and loop 20a from the adjacent guide 2. As will be understood from Fig. 5, the loop 20a and rocker 20c permit the cradle to be moved outwardly away from the motor 3 but automatically lock the cradle to the adjacent guide to prevent movement of the cradle in the opposite direction, so that when the generator 5 is secured to the cradle, the single operation of moving the cradle 19 outwardly to the limit of the belt 15, it is fixed in position, and thus maintains the latter taut. Upon the release of the cam and loop 20a from the adjacent guide 2, the cradle 19 may be moved on the guides 2 inwardly (to the left as viewed in Figs. 1 and 5) to permit the belt 15 to be applied to or removed from the pulley 5a.

Figs. 6 and 7 illustrate a modification embodying a different form of adjustment mechanism for the swinging of the frame 10, which carries the counter-shaft 9, about the shaft 11 to move the pulleys 8a, 12, toward and from the pulleys 7, 14, respectively, and a different form of mechanism for locking the adjustment mechanism in its selected adjusted position. The locking mechanism is constructed to permit free movement of the adjustment mechanism in a direction to swing the frame 10 away from the motor but to releasably lock it against movement in the opposite direction, so that in any position of the pulleys 8a and 12, the belts engaging therewith will be maintained taut to insure frictional drive thereby. In this form of adjustment mechanism the cross member 10d is formed with an opening in which a screw threaded stud 27 is mounted and rigidly secured to the cross member by nuts 27a. The stud 27 is provided with a bifurcated outer end 27b pivotally connected to one end of a link 28. The opposite end of the link 28 is pivotally connected to one end of a second link 29, the opposite end of which is suitably fixed to a rock shaft 30. The opposite end portions of the shaft 30 are mounted in alined openings formed in the upstanding walls of the angles 1e. The extended end of the shaft 30 extends into and is suitably fixed to a hub 31 provided on the inner end of a handle 31a. As will be apparent from Figs. 6 and 7, movement of the handle 31a will operate through the shaft 30 and linkage 28—29 to swing the frame 10 in either direction. 32 indicates as an entirety a lock-and-release mechanism for the handle 31a, whereby the latter when operated in either direction to adjust the frame 10 and thus move the pulleys 8a, 12, in a direction to increase or decrease the speed of the generator shaft, may be secured in adjusted position. The mechanism 32 consists of the following: 32a indicates a pair of spaced standards suitably fixed to the adjacent side wall of the base section 1a and extending upwardly therefrom on the outer side of the handle 31a. The upper ends of the standards 32a support the opposite ends of a rod 32b, preferably consisting of a cap screw extending through an opening in one standard 32a and threaded at its free end into an opening in the other standard. 32c indicates a loop loosely surrounding the rod 32b and arranged to rock thereon. The sides of the loop 32c are provided with vertically disposed extensions 32d which are pivotally connected to the lower end portion of a lever 32e. At a point remote from the loop 32c the lever 32e is pivotally connected to the handle 31a by a link 33. The lower end of the lever 32e terminates in a cam (similar to cam 25' on rocker 25 as already set forth) arranged to engage the rod 32b. 33a indicates a spring one end of which is connected to the lever 32e or loop extensions 32d and its other end connected to the handle 31a. By preference one end of the spring 33a is connected to the pivot between the loop extensions 32d and the lever 32e and its opposite end is connected to a pin 33b extending laterally from the handle 31a. The spring 33a serves to swing the adjacent ends of the lever 32e and loop 32c toward the handle 31a, so that the cam on the end of the lever 32e and loop 32c engage the rod 32b under pressure to lock the handle 31a against movement toward the motor 3. In this arrangement the handle 31a may be moved away from the motor 3 and automatically locked against movement toward the motor. By grasping the gripping portions of the handle 31a and lever 32e and operating the latter to swing its cam carrying end against the tension of the spring 33a, the cam and loop 32c will be released from the rod 32b and permit the handle 31a to be moved toward the motor 3.

To those skilled in the art to which our invention relates, many changes in construction and widely differing embodiments and applications of the invention will suggest themselves without departing from the spirit and scope of the invention. Our disclosures and the description herein are purely illustrative and are not intended to be in any sense limiting.

What we claim is:

1. In a mechanism for driving the shaft of an apparatus to be tested, one end of the shaft being provided with a pulley, the combination with a base and a motor mounted on said base, of means on said base at one side of said motor for securing the apparatus thereon with the shaft of the apparatus parallel to the motor shaft, a second pulley on that end of the shaft of said motor remote from the first mentioned pulley, said second pulley consisting of a pair of disks keyed to the shaft of the motor and having opposed conical faces, one of said disks being slidable endwise of said motor shaft away from and toward the other disk, spring operated devices for moving said slidable disk toward the other disk, a support swingably mounted at its lower end on said base at that side of said motor remote from the apparatus on an axis parallel to the motor shaft, a counter-shaft disposed parallel to the motor shaft, mounted on said support for movement therewith, a third pulley fixed to one end portion of said counter-shaft in alinement with said second mentioned pulley and formed with a V-shaped belt receiving groove, an endless belt engaging said alined pulleys to drive said last mentioned pulley, a separate pulley mounted on the other end portion of said counter-shaft and consisting of a pair of disks keyed to said counter-shaft and having opposed conical faces, one of said disks being slidable away from and toward the other disk, spring operated devices for moving said slidable disk toward the other disk, a supplemental pulley consisting of fixedly related, side-by-side endless belt engaging members rotatably mounted between and in alinement with said separate pulley and said first mentioned pulley, respectively, the periphery of that member in alinement with said separate pulley being V-shaped, an endless belt between and engaging each of said members and the pulley alined therewith, and means for swinging said support to move said counter-shaft toward and from said pulley on the motor shaft and said supplemental pulley.

2. A mechanism as claimed in claim 1 wherein the pulley on the shaft of the apparatus and the belt engaging member alined therewith have a differential speed ratio.

3. A mechanism as claimed in claim 1 wherein said supplemental pulley is rotatably supported on that side of the housing for said motor adjacent to said first mentioned pulley.

4. A mechanism as claimed in claim 1 wherein the means for securing the apparatus on said base consists of guides thereon disposed at right angles to the motor shaft, a slide movably mounted on said guides removably supports the apparatus and spring controlled lock-and-release devices are provided between said slide and said guides to releasably prevent movement of the slide toward said motor.

JOHN W. KING.
JAMES J. McNAMEE.

References Cited in the file of this patent

UNITED STATES PATENTS

| Number | Name | Date |
|---|---|---|
| 239,389 | Kenyon | Mar. 29, 1881 |
| 2,179,053 | Reeves | Nov. 7, 1939 |
| 2,202,384 | Jacobsen | May 28, 1940 |
| 2,417,047 | Alexander | Mar. 11, 1947 |
| 2,501,450 | McKee | Mar. 21, 1950 |